United States Patent [19]

Nishimura et al.

[11] Patent Number: 5,268,420
[45] Date of Patent: Dec. 7, 1993

[54] AQUEOUS POLYESTERS, EASILY BONDABLE POLYESTER FILMS FORMED BY COATING SAID AQUEOUS POLYESTERS, AND PROCESS FOR PRODUCING SAME

[75] Inventors: Akihiro Nishimura, Kobe; Sadayoshi Miura, Yamato; Tetsuo Ichihashi, Matsuyama, all of Japan

[73] Assignee: Teijin Limited, Osaka, Japan

[21] Appl. No.: 974,125

[22] Filed: Nov. 10, 1992

[30] Foreign Application Priority Data

Nov. 18, 1991 [JP] Japan ................. 3-328308

[51] Int. Cl.$^5$ ............................................. C08L 67/02
[52] U.S. Cl. ................................. 524/857; 524/878; 524/601; 524/603; 524/604; 524/605; 528/71; 427/372.2; 427/393.5
[58] Field of Search ............... 524/857, 878, 601, 603, 524/604, 605; 528/71; 427/372.2, 393.5; 428/480

[56] References Cited

U.S. PATENT DOCUMENTS

| | | | |
|---|---|---|---|
| 3,503,918 | 3/1970 | Le Sota et al. | 260/29.7 |
| 3,666,698 | 5/1972 | Harris et al. | 260/22 M |
| 4,087,290 | 5/1978 | Kopietz et al. | 148/18 |
| 4,113,682 | 9/1978 | Nagata et al. | 260/29 |
| 4,243,704 | 1/1981 | Hall et al. | 427/327 |
| 4,251,292 | 2/1981 | Foreman et al. | 148/18 |
| 4,252,921 | 2/1981 | Merrill et al. | 525/437 |
| 4,404,044 | 9/1983 | Warchol | 148/18 |
| 4,476,189 | 10/1984 | Posey et al. | 428/336 |
| 4,486,246 | 12/1984 | Warchol | 148/18 |
| 4,528,044 | 7/1985 | Warchol | 148/18 |
| 4,650,527 | 3/1987 | Ishii et al. | 148/6.16 |
| 4,690,837 | 9/1987 | Doroszkowski | 427/314 |
| 4,738,731 | 4/1988 | Foreman et al. | 148/18 |
| 5,061,523 | 10/1991 | Shacnat | 427/377 |
| 5,112,413 | 5/1992 | Carey et al. | 148/251 |

FOREIGN PATENT DOCUMENTS

| | | |
|---|---|---|
| 0081925 | 6/1983 | European Pat. Off. . |
| 1915319 | 10/1969 | Fed. Rep. of Germany . |
| 2099858 | 12/1982 | United Kingdom . |

OTHER PUBLICATIONS

WPIL, AN 91-250051, Derwent Publications, London GB, "Polyester Composite Film", Jul. 16, 1991.
WPIL, AN 91-243711, Derwent Publications, London GB, "Acidic Polyester Resin Preparation", Jul. 28, 1990.

*Primary Examiner*—Maurice J. Welsh
*Attorney, Agent, or Firm*—Wenderoth, Lind & Ponack

[57] ABSTRACT

An aqueoous polyester comprising a polybasic acid component containing not less than 5 mol%, based on the total amount of the acid component, of phenylindanedicarboxylic acid. An easily bondable polyester film wherein a thin layer of the aqueous polyester is coated on at least one side of the polyester film.

7 Claims, 1 Drawing Sheet

AQUEOUS POLYESTERS, EASILY BONDABLE POLYESTER FILMS FORMED BY COATING SAID AQUEOUS POLYESTERS, AND PROCESS FOR PRODUCING SAME

This invention relates to an aqueous polyester, an easily bondable polyester film formed by coating the aqueous polyester, and a process for producing same. More specifically, this invention relates to an aqueous polyester capable of forminng an easily bondable coating film excellent in water resistance and blocking resistance and rich in abrasion resistance, an easily bondable polyester film formed by coating the aqueous polyester and useful as a substrate of a packaging material, a magnetic card, a magnetic tape, a magnetic disc, a printing material, or the like.

PRIOR ART

A polyester film obtained by melt-extruding a thermoplastic polyester such as polyethylene terephthalate, poly(1,4-cyclohexylenedimethylene terephthalate), polyethylene terephthalate, a copolymer of these, a blend of these and a small proportion of the other resin, or the like, biaxially stretching the extrudate, and then conducting heat-setting is excellent in mechanical strength, heat resistance, chemical resistance, etc., and utilized in various industrial fields. Since the surface of the polyester film is, however, highly oriented and crystallized, acceptability of a paint, an adhesive, an ink, or the like is poor.

As a method to increase acceptability of the polyester film surface, there is a method in which a primer layer (an undercoat layer) composed of a synthetic resin is previously formed on the surface of the film to give a thin surface layer different in nature from a base film. Formation of the primer layer is conducted by coating it with the use of an organic solvent solution of a synthetic resin or desirably an aqueous solution thereof.

As the aqueous solution for forming the primer layer, for example, Japanese Laid-open Patent Application Nos. 248232/1985 and 236247/1989 use an aqueous solution of a polyester-type polymer having a sulfonic acid derivative as a substituent. Aromatic dicarboxylic acids or aliphatic dicarboxylic acids are used as an acid component of the polymer.

Nevertheless, when, e.g., naphthalene dicarboxylic acid is used as the acid component of the polymer, a second-order transition point (Tg) of the polymer rises and heat resistance increases, but flexibility is lost; a brittle polymer results. On the other hand, when adipic acid is used, the polymer is soft and flexibility increases, but Tg decreases; a polymer having low heat resistance results. In the former case, the primer layer made of said polymer is good in water resistance and blocking resistance but poor in abrasion resistance relative to brittleness of the polymer. While in the latter case, it is good in abrasion resistance but poor in water resistance and blocking resistance.

An object of this invention is to provide an aqueous polyester capable of forming an easily bondable coated film excellent in water resistance and blocking resistance and good in abrasion resistance, an easily bondable polyester film formed by coating said polyester, and a process for producing same.

OUTLINE OF THE INVENTION

To achieve such an object, this invention is to provide the following.

1. An aqueous polyester comprising a polybasic acid component containing not less than 5 mol%, based on the total amount of the acid component, of phenylindanedicarboxylic acid.

2. An easily bondable polyester film wherein a thin layer of the aqueous polyester recited in the above 1 is coated on at least one side of the polyester film.

3. A process for producing an easily bondable polyester film, which comprises coating an aqueous solution of the aqueous polyester recited in the above 1 on at least one side of the polyester film before completing orientation and crystallization, and then conducting drying, stretching and heat-setting to complete orientation and crystallization.

4. A process for producing an easily bondable polyester film, which comprises coating an aqueous solution of the aqueous polyester recited in claim 1 on at least one side of a polyester film monoaxially stretched longitudinally, then drying the coated film, transversely stretching the dried film, further longitudinally restretching the stretched film, restretching said film transversely if required, and heat-setting the restretched film.

The aqueous polyester of this invention is an aqueous polyester containing not less than 5 mol% based on the total amount of the acid component. The amount of the phenylindanedicarboxylic acid component is preferably not less than 30 mol%, more preferably not less than 50 mol% based on the total amount of the acid component. Said amount can be 100 mol% depending on the type of the polyol compound. When the amount of the phenylindanedicarboxylic acid component is less than 5 mol%, heat resistance and flexibility of the polymer are not balanced; this is undesirous.

The aqueous polyester of this invention can be produced by reacting the polybasic acid containing not less than 5 mol% of phenylindanedicarboxylic acid or its ester-forming derivatives with the polyol compound or its ester-forming derivatives.

As phenylindanedicarboxylic acid, a compound represented by the following formula is taken.

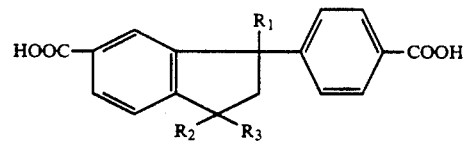

wherein $R_1$, $R_2$ and $R_3$ each denote hydrogen or lower alkyl. Examples of the lower alkyl are methyl, ethyl and propyl. Preferable examples of phenylindanedicarboxylic acid are 1,1,3-trimethyl-3-phenylindane-4',5-dicarboxylic acid and 1-methyl-1,3-dimethyl-3-phenylindane-4',5-dicarboxylic acid.

Examples of dibasic acids other than phenylindanedicarboxylic acid are terephthalic acid, isophthalic acid, phthalic acid, phthalic anhydride, 2,6-naphthalenedicarboxylic acid, 4,4'-diphenyldicarboxylic acid, 1,4-cyclohexanedicarboxylic acid, adipinic acid, sebacic acid, trimellitic acid, pyromellitic acid, and dimer acid. Of these, terephthalic acid and 2,6-naphthalenedicarboxylic acid are preferable. They may be used in combination. Moreover, an unsaturated polybasic acid or a hydroxycarboxylic acid can be used in a small amount together with the above compounds. Examples of the unsaturated polybasic acid are maleic acid, fumaric acid and itaconic acid. Examples of the hydroxycarboxylic acid are p-hydroxybenzoic acid and p-(beta-hydroxyethoxy)benzoic acid. The amount of the unsaturated polybasic acid or the hydroxycarboxylic acid is at most 10 mol%, preferably at most 5 mol% based on the total amount of the acid component.

A desirable example of the ester-forming derivative of the dibasic acid is a lower alkyl ester, especially a methyl ester.

Examples of the polyol component are ethylene glycol, 1,4-butanediol, neopentyl glycol, diethylene glycol, dipropylene glycol, 1,6-hexanediol, 1,4-cyclohexanedimethanol, xylylene glycol, dimethylolpropionic acid, glycerin, trimethylolpropane, poly(ethylene oxide) glycol, and poly(tetramethylene oxide) glycol. They can be used in combination.

A desirable example of the ester-forming derivative of the polyol compound is a lower aliphatic acid ester, especially, an acetic acid ester.

In producing the aqueous polyester, it is advisable to copolymerize a compound having a hydrophilic group in a molecule, examples of said compound being an organosulfonic acid salt, a carboxylic acid salt, diethylene glycol, polyethylene glycol, dimethyl-5-[N-(p-tolylsulfonyl)potassioiminosulfonyl]-1,3-phenylene dicarboxylate, and dimethyl-3,3'-(sodioiminodisulfonyl)benzoate. This is advantageous in forming an aqueous solution, especially an aqueous emulsion. Introduction of the carboxylic acid salt ordinarily uses a trifunctional or higher carboxylic acid. When using this carboxylic acid, branching occurs during the polymerization step, and gelation tends to occur. Thus, it is advisable that the amount of said carboxylic acid salt is small. Meanwhile, introduction of hydrophilic nature by the sulfonic acid salt, diethylene glycol, polyethylene glycol, or the like does not pose such a problem as in case of using the carboxylic acid salt, and is therefore more advantageous.

It is advisable to use a polybasic carboxylic acid or polyhydric alcohol having a sulfonic acid alkali metal salt or sulfonic acid amine salt groups in introducing a sulfonic acid salt group in a molecule of a polyester. Examples thereof are 5-sodiumsulfoisophthalic acid, 5-ammoniumsulfoisophthalic acid, 4-sodiumsulfoisophthalic acid, 4-methylammoniumsulfoisophthalic acid, 2-sodiumsulfoterephthalic acid, 5-potassiumsulfoisophthalic acid, 4-potassiumsulfoisophthalic acid, 2-potassiumsulfoterephthalic acid, and sodiumsulfosuccinic acid. The amount of the polybasic carboxylic acid or the polyhydric alcohol having the sulfonic acid salt group is 0.5 to 20 mol%, preferably 1 to 18 mol% based on the total amount of the acid component or the alcohol component.

To introduce the carboxylic acid salt group into the molecule of the polyester, a compound such as trimellitic anhydride, trimellitic acid, pyrromellitic anhydride, pyrromellitic acid, trimesic acid, cyclobutanetetracarboxylic acid or dimethylol propionic acid can be used.

The aqueous polyester of this invention has a high second-order transition point (Tg) and excellent flexibility owing to bulkiness based on the structure peculiar to the phenylindanedicarboxylic acid component and hardness due to low mobility of the molecular chain. The second-order transition point is usually 50° C. or higher, preferably 70° C. or higher. The number average molecular weight of the aqueous polyester is 5,000 to 40,000, preferably 10,000 to 30,000. This molecular weight is found by gel permeation chromatography (GPC).

When using the aqueous polyester of this invention, a thin film excellent in water resistance, blocking resistance, abrasion resistance and easy bondability can be coated on the surface of te polyester film. Accordingly, this invention can provide the easily bondable polyester film wherein the primer layer made of the thin layer of the aqueous polyester is coated on at least one side of the polyester film.

It is advisable to form such a primer layer by coating the aqueous coating solution during production of the polyester film. For example, it is advisable to coat the aqueous coating solution of the aqueous polyester on the surface of the polyester film before completing orientation and crystallization.

The polyester film before completing orientation and crystallization includes an unstretched film obtained by heat-melting the polymer and making it filmy as such, a monoaxially stretched film obtained by stretching the unstretched film either longitudinally or transversely, and a film which is stretched in both longitudinal and transverse directions at a low stretch ratio (a biaxially stretched film before finally restretching either longitudinally or transversely and completing orientation and crystallization). Of these, the film which is monoaxially stretched longitudinally is preferable.

Preferable examples of a method for producing an easily bondable polyester film are a method in which the easily bondable polyester film is produced by coating an aqueous coating solution of the aqueous polyester on at least one side of the longitudinally monoaxially stretched polyester film, and then conducting drying, stretching and heat-setting, and a method in which the easily bondable polyester film is produced by coating the aqueous coating solution of the aqueous polyester on at least one side of the longitudinally monoaxially stretched polyester film, then drying the coated film, transversely stretching the dried film, longitudinally restretching the film, transversely restretching the film if required, and conducting heat-setting.

The conditions for producing the polyester film can be those known or used so far.

The polyester making up the polyester film is a linear saturated polyester comprising an aromatic dibasic acid or its ester-forming derivatives and a diol or its ester-forming derivatives. Examples of the polyester are polyethylene terephthalate, polyethylene isophthalate, polybutylene terephthalate, poly(1,4-cyclohexylenedimethylene terephthalate), and polyethylene-2,6-naphthalene dicarboxylate. Their copolymer or their blend with a small amount of the other resin is also included therein.

The easily bondable polyester film of this invention is desirously produced by a so-called in-line coating method in which a coating solution of the aqueous polyester is applied to the film which is unstretched or stretched at least monoaxially before completing orientation and crystallization, and then conducting longitudinal stretching and/or transverse stretching and heat-setting. On that occasion, it is advisable that in order to smoothly apply a coated film to the surface of the polyester film before completing orientation and crystallization, the film surface is subjected to corona discharge treatment as pretreatment or the aqueous polyester and a surface active agent chemically inactive thereto are used conjointly. The surface active agent expedites such wetting of the polyester film as to be able to decrease the surface tension of the aqueous solution below 50 dyne/cm. Examples of the surface active agent are anionic and nonionic surface active agents such as polyoxyethylenealkylphenyl ethers, polyoxyethylenealiphatic acid esters, sorbitan aliphatic acid esters, glycerin aliphatic acid esters, aliphatic acid metal soaps, alkyl sulfates, alkyl sulfonates, alkylsulfosuccinic acid salts.

The aqueous solution includes a solution containing an aqueous polyester dissolved therein, and a colloidal suspension or dispersion of the aqueous polyester.

The solids content of the coating solution, especially the aqueous coating solution is usuaslly not more than 30% by weight, preferably not less than 15% by weight. Viscosity is not more than 100 cps, preferably not more than 20 cps. The amount coated of the coating solution is about 0.5 to 20 g, preferably about 1 to 10 g per $m^2$ of the film. In other words, in the final biaxially oriented film, the solids content on one surface of the film is about 0.001 to 1 g, preferably about 0.005 to 0.3 g per $m^2$ of the film.

The coating solution may contain, as required, a surface active agent, an antistatic agent, a filler, an ultraviolet absorber, a lubricating agent, and a colorant. In case of the aqueous coating solution, a small proportion (e.g., less than 30%) of the aqueous organic solvent can be used conjointly to improve coatability. Examples of the organic solvent are desirously lower alcohols such as methanol, ethanol, propanol and butanol.

As a coating method, a known coating method is available. Examples of such a coating method are a roll coating method, a gravure coating method, a roll brushing method, a spray coating method, an air knife coating method, a dipping method and a curtain coating method. They may be used either singly or in combination.

According to a desirous process in this invention, the aqueous solution is coated on a polyester film just after monoaxial stretching in a longitudinal direction, and the film is then led to a tenter for transverse stretching and heat-setting after preheating.

At that time, the coated aqueous solution is thoroughly dried in a preheating zone, but dried to such an extent that a small amount of water remains. Subsequently, the monoaxially oriented film having the primer layer coated thereon is heated, transversely stretched and heat-set by high-temperature treatment.

The conditions for orientation and crystallization, e.g., stretching and heat-setting, of the polyester film can be those known in the art. For instance, the film is stretched 2.5 to 6× at 80° to 140° C., and then heat set at 180° to 240° C. for 5 seconds.

The thus obtained easily bondable polyester film is high in bondability, rich in abrasion resistance and excellent in blocking resistance and water resistance, and is therefore useful as, for example, a substrate of a magnetic card, a magnetic tape, a magnetic disc, a printing material, a graphic material, a photosensitive material, or the like.

The following Examples illustrate this invention more specifically. By the way, "parts" in said Examples are all by weight.

Figure 1:
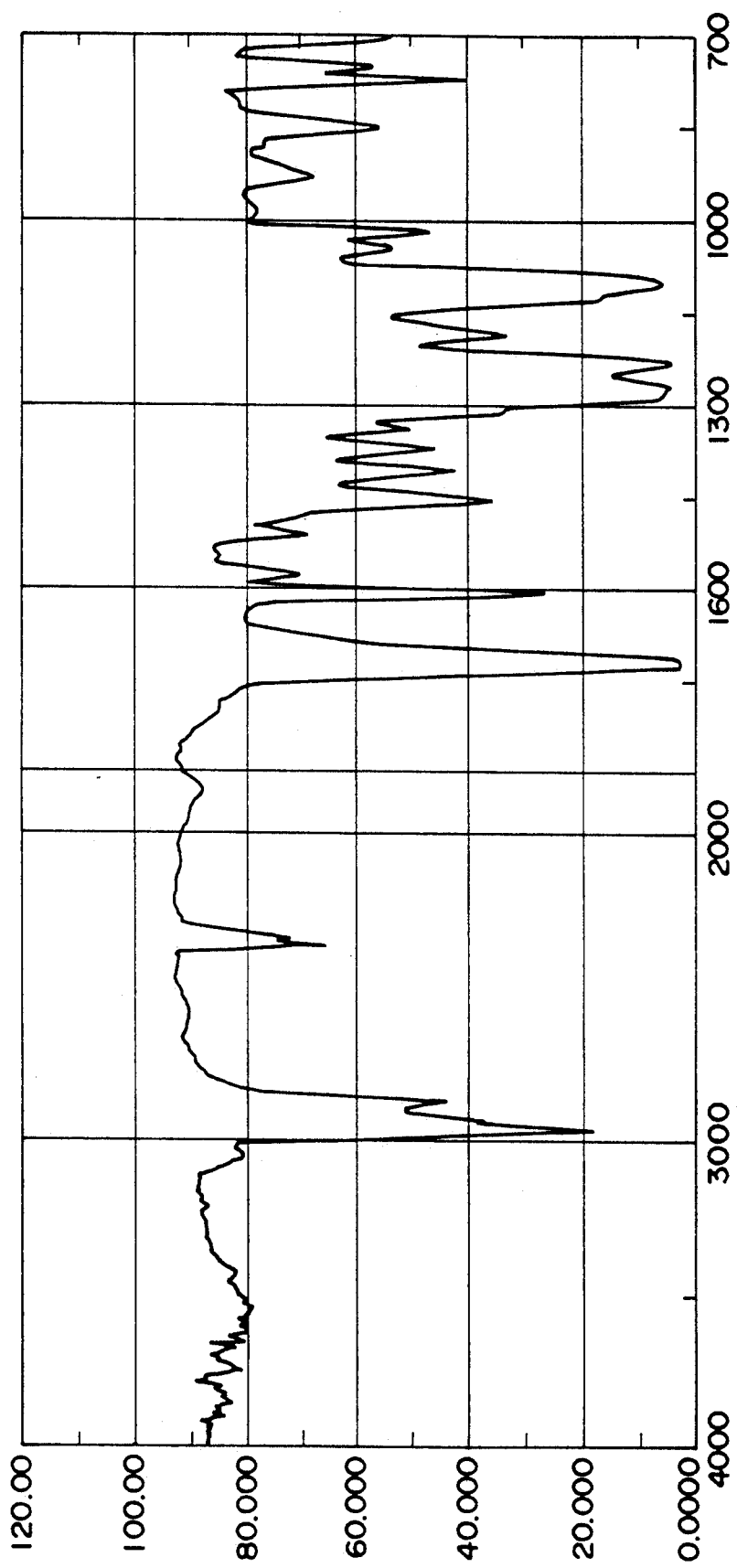
FIG. 1 is an infrared absorption chart of an aqueous polyester obtained in Example 1.

The properties were measured by the following methods.

1. Bondability (A) Magnetic paint

A paint for evaluation was coated on a sample polyester film to a dry thickness of about 4 micrometers with a Mayer bar, and dried at 100° C. for 3 minutes. Then, ageing was conducted at 60° C. for 24 hours. A Scotch tape No. 600 (made by 3 M K. K.) 12.7 in width and 15 cm in length was adhered to the aged film so as not to introduce bubbles therein, and rolled with a manual load roll described in JIS C2701 (1975) for bonding. The resulting film was cut to a tape width. Strength given when said cut film was peeled off at 180° was measured.

| [Paint for evaluation] | parts (as a solids content) |
| --- | --- |
| 1. Urethane resin Nippran 2304 (a trademark for a product of Nippon Polyurethane K.K.) | 25 |
| 2. Vinyl chloride/vinyl acetate copolymer resin Esunic A (a trademark for a product of Sekisui Kagaku Kogyo K.K. | 50 |
| 3. Dispersing agent Reshion P (a trademark for a product of Riken Vitamin K.K.) | 1 |
| 4. Magnetic agent CTX-860 (a trademark for a product of Toda Kagaku Kogyo K.K.) | 500 |

The above components were dissolved in a methyl ethyl ketone/toluene/cyclohexanone mixed solvent to form a 40% solution, and dispersed with a sand grinder for 2 hours. Subsequently, 25 parts (as a solids content) of Coronate L (a trademark for a crosslinking agent of Nippon Polyurethane K. K.) were added, and the mixture was well stirred to obtain a magnetic paint.

(B) UV ink

A sample polyester film was printed with ultraviolet curing-type printing ink (Flash Dry FDO Red APN - a trademark for a product of Toyo Ink Mfg. Co., Ltd.) with an RI tester (manufactured by Akari Seisakusho K. K.), and then cured with a UV curing device fitted with a medium pressure mercury lamp (18 W/cm, single lamp type: manufactured by Nippon Storage Battery Co., Ltd.) to form a 7.0 micrometer-thick UV ink layer.

Crosscuts were applied to the UV ink layer with a cutter knife, and a cellophane adhesive tape was adhered thereto. A 90° peeling test was conducted, and the peel state was evaluated with five grades [5 (good) ⟵⟶1 (bad)].

(C) Offset ink

Ink (HS-OS: a trademark for a product of Kuboi Ink K. K.) was coated on a sample polyester film with a gieser to a dry thickness of 10 micrometers, dried with air at 120° C. for 1 minute and further at room temperature for 1 day. Subsequently, crosscuts were applied to the ink with a cutter knife, and a cellophane adhesive tape was adhered thereto. A 90° peeling test was conducted, and the peel state was evaluated with five grades [5 (good) ⟵⟶1 (bad)].

(D) Screen ink

Ink (Sericol EG: a trademark for a product of Teikoku Ink K. K.) was coated on a sample polyester film with a gieser to a dry thickness of 10 micrometers, and dried with air at room temperature for 1 day. Crosscuts were applied to the coated ink with a cutter knife, and a cellophane adhesive tape was adhered thereto. A 90° peeling test was conducted, and the peel state was evaluated with five grades [5 (good) ←→1 (bad)]. The 5-grade evaluation of the ink follows the standard shown in Table 1.

TABLE 1

| | |
|---|---|
| 5 | Ink is not peeled off at all. |
| 4 | More than 70% of ink remains. |
| 3 | More than 50% of ink remains. |
| 2 | More than 30% of ink remains. |
| 1 | Ink is all peeled off. |

2. Blocking resistance

A treated surface and an untreated surface of two films were superposed, and a pressure of 6 kg/cm$^2$ was exerted thereon at 50° C. and relative humidity of 70% for 17 hours. The surfaces were then peeled off. Blocking resistance was evaluated by peel strength (gram per 5 cm width).

3. Surface slipperiness

Slipperiness of treated and untreated surfaces was shown with a coefficient of static friction measured at 23° C. and relative humidity of 60% with a 1 kg load using a slipperiness measuring tester manufactured by Toyo Tester K. K.

4. Abrasion resistance

A coated surface of a roll film having a width of ½ inch was contacted with a fixing pin, and the film was run at a rate of 2 m/min. Fifteen minutes later, a deposit on the fixing pin was observed, and evaluation was conducted as follows.

○: No deposit is observed.
△: A deposit is somewhat observed.
x : A large amount of a deposit is observed.

5. Second-order transition temperature (Tg) of a polymer

Measured at a rate of temperature rise of 20° C./min using a differential scannining calorimeter.

6. Molecular weight of a polymer

A polymer was dissolved in tetrahydrofuran, and the molecular weight thereof was measured by gel permeation chromatography (GPC).

EXAMPLE 1

Phenylindanedicarboxylic acid (PIDA: 0.98 mol) represented by formula I

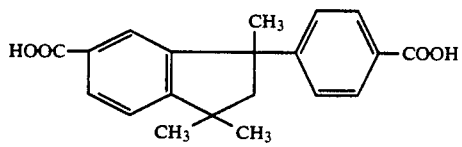

and 1.47 mols of ethylene glycol were charged in a reaction vessel, and heated at 200° to 233° C. under an N$_2$ atmosphere to complete esterification reaction. Subsequently, 0.02 mol of 5-sodiumsulfoisophthalic acid bis(ethylene glycol) ester and a small amount of a polymerization catalyst were added, and a polymerization reaction was conducted in vacuo at 300° C. The resulting polymer had Tg of 142° C. and a molecular weight of 26,000. An infrared absorption chart of the polymer is as shown in FIG. 1.

The polymer was dissolved in tetrahydrofuran, and dispersed with water. Then, tetrahydrofuran was evaporated to obtain an aqueous dispersion having a concentration of 4%. Further, 90 parts by weight of the aqueous dispersion and 10 parts by weight of a surface active agent (Nonion NS208.5—a trademark for a product of Nippon Oils & Fats Co., Ltd.) having a concentration of 4% were mixed to prepare an aqueous dispersion coating solution.

Polyethylene terephthalate (containing a lubricant) having intrinsic viscosity of 0.62 was melt-extruded onto a rotary cooling drum maintained at 20° C., and stretched 3.6× in a machine direction. Then, the aqueous dispersion coating solution was roll-coated. Thereafter, the film was transversely stretched 3.7× at 130° C., and heat-treated at 216° C. to obtain a 75 micrometer-thick primer coated biaxially oriented polyester film. The dry thickness of the coating was 0.04 g/m$^2$.

Properties, i.e., ink bondability, surface slipperiness and blocking resistance of the coated surface of the resulting film are shown in Table 2.

COMPARATIVE EXAMPLE 1

For comparison, using a 75 micrometer-thick polyethylene terephthalate film not treated with a primer, evaluation was conducted as in Example 1. The results are shown in Table 2.

EXAMPLES 2 to 4

In the same way as in Example 1, an aqueous polyester of a composition shown in Table 3 was produced, and an aqueous dispersion coating solution containing said aqueous polyester dispersed therein was formed. A coating film was obtained as in Example 1. The properties thereof are shown in Table 2.

EXAMPLE 5

Example 1 was repeated except using a compound represented by formula II

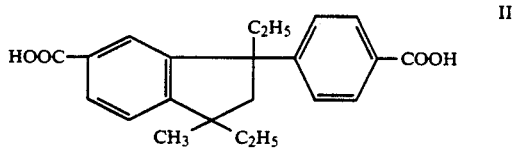

instead of phenylindanedicarboxylic acid of formula I. The results are shown in Table 2.

TABLE 2

| | Ink easy bondability | | Surface slipperiness | Blocking resistance [g/5 cm width] |
|---|---|---|---|---|
| | offset ink | Screen ink | | |
| ink | | | | |
| Example 1 | 4 | 5 | 5 | 0.40 | 0 |
| Comparative Example 1 | 1 | 2 | 2 | 0.45 | 0 |
| Example 2 | 4 | 5 | 5 | 0.42 | 0 |
| Example 3 | 5 | 4 | 5 | 0.43 | 0 |
| Example 4 | 4 | 5 | 5 | 0.42 | 0 |

TABLE 2-continued

| | Ink easy bondability | | Surface slipperi- | Blocking resistance [g/5 cm |
|---|---|---|---|---|
| | offset | Screen | | |
| | ink | ink | ness | width] |
| Example 5 | 4 | 5 | 5 | 0.40 | 0 |

EXAMPLES 6 to 9

In the same way a3 in Example 1, an aqueous polyester of a composition shown in Table 3 was produced, and an aqueous dispersion coating solution containing said aqueous polyester dispersed therein was formed.

Polyethylene terephthalate having intrinsic viscosity of 0.62 was melt-extruded onto a rotary cooling drum maintained at 20° C. to form an unstretched film. Said unstretched film was stretched 3.7× in a machine direction, and the aqueous dispersion coating solution of the aqueous polyester in Table 3 was then roll-coated. Subsequently, the film was transversely stretched 3.9× at 101° C., and heat-treated at 216° C. to obtain a 10 micrometer-thick primer coated biaxially oriented polyester film. The dry thickness thereof was 0.04 g/m².

Properties, i.e., ink bondability, surface slipperiness, abrasion resistance and blocking resistance, of the coated surface of the resulting film are shown in Table 4.

COMPARATIVE EXAMPLE 2

For comparison, using a 10 micrometer-thick polyethylene terephthalate film not treated with a primer, evaluation was conducted as in Example 6. The results are shown in Table 4.

COMPARATIVE EXAMPLES 3 and 4

In the same way as in Example 6, an aqueous dispersion coating solution of a polyester of a composition shown in Table 3 was coated to obtain a primer coated biaxially oriented polyester film.

Using the resulting film, evaluation was conducted as in Example 6. The results are shown in Table 4.

TABLE 3

| | Aqueous polyester (90 wt %) | | | | | | | | | Characteristics | | Surface active agent (10 wt %) | Coating medium |
|---|---|---|---|---|---|---|---|---|---|---|---|---|---|
| | Polybasic acid (mol %) | | | | | | Polyol (mol %) | | | Average molecular | | | |
| | PIDA | QA | TA | IA | AdA | Others | EG | NPG | BPA-4 | Tg | weight | | |
| Example 6 | 96 | | | | | NA-SIA 4 | 100 | | | 142 | 27000 | Nonion NS208.5 | water 100% |
| Example 7 | 98 | | | | | Na-SIA 2 | 95 | | 5 | 128 | 22000 | Nonion NS208.5 | water 100% Tetrahydrofuran 5% |
| Example 8 | 90 | 7 | | | | Na-SIA 2 Monosodium trimellitate 1 | 100 | | | 130 | 2400 | Nonion NS240 | water 100% |
| Example 9 | 92 | | | | | K-SIA 8 | 90 | | 10 | 116 | 23000 | Newcol 271S | " |
| Example 10 | 96 | | | | | Na-SIA 4 | 100 | | | 142 | 27000 | Nonion NS208.5 | " |
| Example 11 | 96 | | | | | Na-SIA 4 | 100 | | | 142 | 27000 | Nonion NS208.5 | " |
| C. Exam. 3 | | | 92 | | | Na-SIA 8 | 100 | | | 73 | 26000 | Nonion NS208.5 | " |
| C. Exam. 4 | | | 70 | 10 | 17 | Na-SIA 3 | | 100 | | 16 | 25000 | Nonion NS208.5 | " |
| Example 2 | 53 | | 43 | | | Na-SIA 4 | 20 | 80 | | 115 | 23000 | Nonion NS240 | " |
| Example 3 | 32 | | 64 | | | Na-SIA 4 | 15 | 85 | | 85 | 22000 | Nonion NS240 | " |
| Example 4 | 10 | | 86 | | | Na-SIA 4 | 15 | 85 | | 75 | 22000 | Nonion NS240 | " |
| Example 5 | 62 | | 34 | | | Na-SIA 4 | 15 | 85 | | 88 | 23000 | Nonion NS240 | " |

C. Exam.: Comparative Example

Abbreviations shown in Table 3 are as follows.
PIDA: phenylindanedicarboxylic acid
QA: 2,6-naphthalenedicarboxylic acid
TA: terephthalic acid
IA: isophthalic acid
AdA: adipic acid
Na-SIA: 5-sodiumsulfoisophthalic acid
EG: ethylene glycol
NPG: neopentyl glycol
BPA-4: ethylene oxide additive of bisphenol A
Nonion NS208.5: a trademark for a nonionic surface active agent of Nippon Oils & Fats Co., Ltd.
Newcol 271S: a trademark for an anionic surface active agent of Nippon Nyukazai K. K.

EXAMPLE 10

A primer coated biaxially oriented polyester film was obtained as in Example 6 except that polyethylene-2,6-naphthalene dicarboxylate having intrinsic viscosity of 0.59 was used and a transverse stretching temperature was changed into 145° C. Characteristics of the film are shown in Table 4.

EXAMPLE 11

Polyethylene terephthalate (containing a lubricant) having intrinsic viscosity of 0.65 was dried at 170° C. for 3 hours, and melt-extruded at 280° C. onto a rotary cooling drum maintained at 20° C. to obtain a 150 micrometer-thick unstretched film. Said film was longitudinally stretched 2× at the 1st stage by an infrared heater method. Then, the aqueous dispersion coating solution in Example 6 was coated on one side of the longitudinally stretched film by a kiss-coating method at a rate of wet 59/m². Thereafter, the coated film was transversely stretched 3.9× at 105° C., and heated with a hot roll. The heated film was longitudinally re-stretched 2.8× at the 2nd stage by a speed difference of two sets of nip rolls, and heat-set at 215° C. for 6 seconds. At this time, the film thickness was 10 micrometers. The thickness of the final primer layer was 0.04 micrometer. Properties of the film are shown in Table 4.

As is clear from Table 4, the films in Examples are those excellent in easy bondability, blocking resistance and abrasion resistance.

As stated above, according to this invention, it is possible to obtain the aqueous polyester capable of forming the easily bondable coated film excellent in water resistance and blocking resistance and rich in abrasion resistance, as well as the easily bondable polyester film useful as a substrate of a packaging material, a magnetic card, a magnetic tape, a magnetic disc or a printing material.

TABLE 4

|  | Easy bondability of a magnetic paint [g/¼" width] | Surface slipperiness | Abrasion resistance | Blocking resistance [g/5 cm width] |
| --- | --- | --- | --- | --- |
| Example 6 | 37 | 0.38 | ◯ | 0 |
| Example 7 | 45 | 0.40 | ◯ | 0 |
| Example 8 | 36 | 0.38 | ◯ | 0 |
| Example 9 | 46 | 0.39 | ◯ | 0 |
| Example 10 | 38 | 0.45 | ◯ | 0 |
| Example 11 | 39 | 0.40 | ◯ | 0 |
| C. Exam. 2 | 10 | 0.45 | ◯ | 0 |
| C. Exam. 3 | 41 | 0.46 | △ | 2 |
| C. Exam. 4 | 51 | 0.48 | ◯ | A basefilm was broken |

C. Exam.: Comparative Example

What we claim is:

1. An aqueous polyester comprising a polybasic acid component containing not less than 5 mol%, based on the total amount of the acid component, of phenylindanedicarboxylic acid.

2. The aqueous polyester of claim 1 wherein a sulfonic acid salt group and/or a carboxylic acid salt group is present in a molecule of the aqueous polyester.

3. The aqueous polyester of claim 1 wherein the polybasic acid component other than phenylindanedicarboxylic acid is terephthalic acid and/or 2,6-naphthalenedicarboxylic acid.

4. An easily bondable polyester film wherein a thin layer of the aqueous polyester of claim 1 is coated on at least one side of the polyester film.

5. A process for producing an easily bondable polyester film, which comprises coating an aqueous solution of the aqueous polyester recited in claim 1 on at least one side of the polyester film before completing orientation and crystallization, and then conducting drying, stretching and heat-setting to complete orientation and crystallization.

6. The process of claim 5 wherein the polyester film before completing orientation and crystallization is a polyester film monoaxially stretched longitudinally.

7. A process for producing an easily bondable polyester film, which comprises coating an aqueous solution of the aqueous polyester recited in claim 1 on at least one side of a polyester film monoaxially stretched longitudinally, then drying the coated film, transversely stretching the dried film, further longitudinally restretching the stretched film, restretching said film transversely if required, and heat-setting the restretched film.

* * * * *